UNITED STATES PATENT OFFICE.

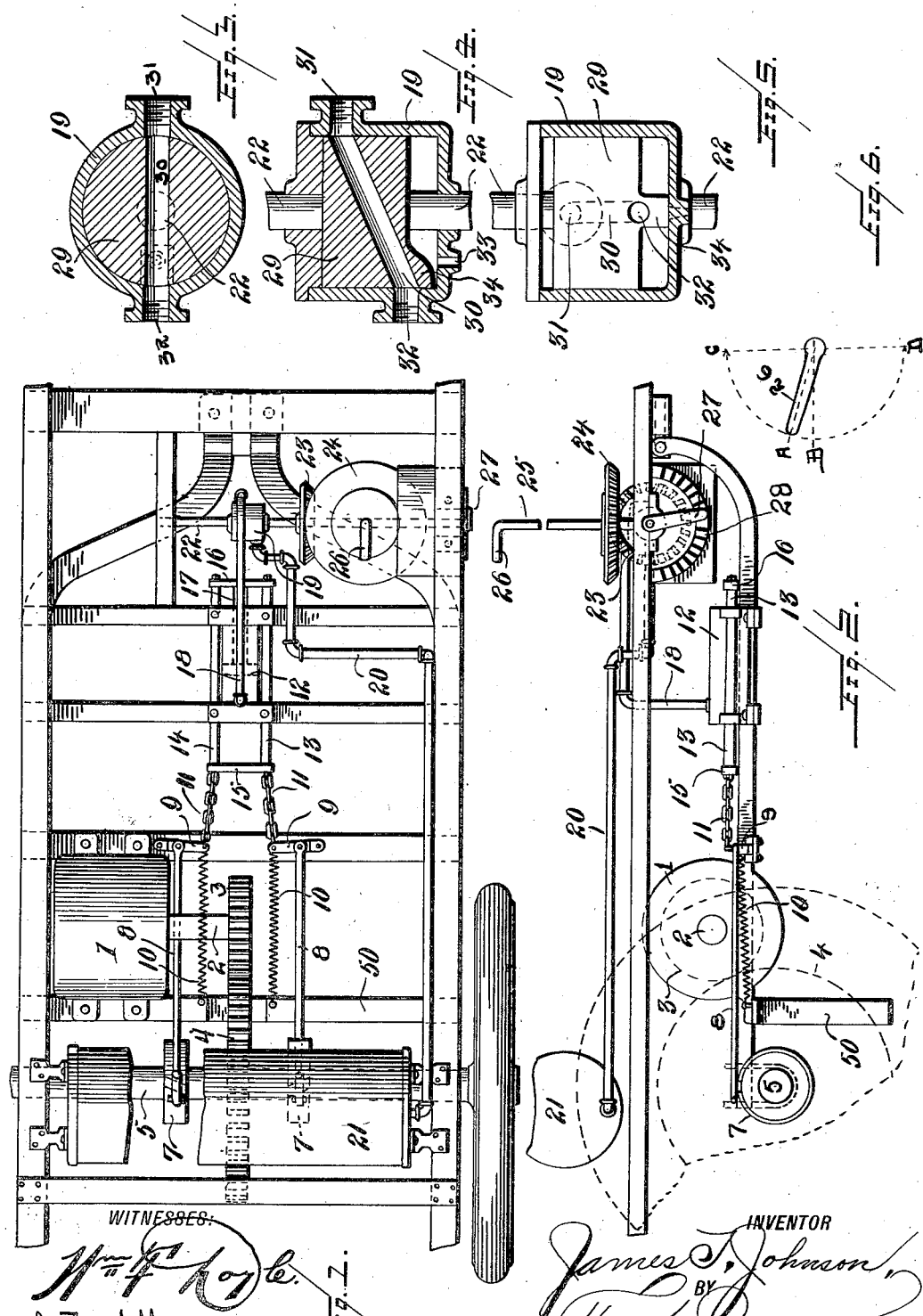

JAMES T. JOHNSON, OF MEMPHIS, TENNESSEE.

AUTOMOBILE AIR-BRAKE.

No. 872,732.　　　　　Specification of Letters Patent.　　　　Patented Dec. 3, 1907.

Application filed October 22, 1906. Serial No. 339,937.

*To all whom it may concern:*

Be it known that JAMES T. JOHNSON, a citizen of the United States, residing at Memphis, in the county of Shelby and State of Tennessee, has invented certain new and useful Improvements in Automobile Air-Brakes, of which the following is a specification.

This invention relates to certain new and useful improvements in air brakes for automobiles, and it relates more particularly to an air brake adapted to be used in connection with motor propelled vehicles such as automobiles.

The invention is particularly adapted for use in connection with electrically driven automobiles, though I do not wish to be understood as confining myself to the use of the invention in connection with an electrically driven vehicle.

The invention has for its object the provision of novel means for applying the brakes of a motor driven vehicle by the utilization of air, the application of the brakes being under the control of the operator at all times and actuated by the same actuating element employed for controlling the motor of the vehicle.

The invention will be hereinafter fully set forth and described, and in the description reference will be had to the accompanying drawings forming a part of this application, and wherein like numerals of reference are employed to designate like parts throughout the several views, and in which:

Figure 1 is a plan view of an automobile frame and a part of the truck showing my improved air brake applied thereto; Fig. 2 is a side elevation of the same; Fig. 3 is a vertical sectional view of the brake valve and casing taken through the ports 32, 30 and 31; Fig. 4 is a central horizontal sectional view of the same; Fig. 5 is a horizontal sectional view of the brake valve casing, showing the brake valve in plan view, and Fig. 6 is a diagrammatical view shown for the purpose of more clearly illustrating the position of the brake valve at certain positions of the actuating and controlling lever.

In the accompanying illustration of my invention, I have shown the same as applied to an electrically driven or propelled motor vehicle. Although so shown, it is to be understood that a gasolene engine, or other power may be used in connection with my improved air brake, the construction of the air brake *per se* remaining substantially the same, such alterations as may be necessary being only those which may be required to adopt the form of air brake shown to the particular form or character of power being utilized.

In the illustration of the invention herein given, 1 designates an electric motor, the armature shaft 2 of which carries a pinion 3, meshing with gear wheel 4, mounted on axle 5, of the automobile truck. Clearance is provided for the large gear wheel 4, by providing the one of the cross bars 50, which supports the electric motor 1, with a depending loop as clearly seen in Figs. 1 and 2.

A strap brake 7, of the usual and well known form is mounted at each side of the power gear wheel 4, on the axle 5, each brake being governed by a rod 8, lever 9, and chain 11, the said chains 11 being connected at one end to a cross head 15. Suitable springs 10 are provided to release the brakes when the power is relieved.

Supported from cross braces of the frame is an air cylinder 12, the piston of which has the outer end of its piston rod 17, secured to a front cross head 16, made rigid with the back cross head 15, by side rods 13, 14 respectively, that work through guides or flanges of the cylinder 12.

A pipe 18 connects with the chamber or cylinder 12, at or near its rear end, the other end of this pipe connecting with the casing 19, of the brake valve. This brake valve casing is also connected by a pipe 20, with the air reservoir 21, supported at a suitable point on the vehicle frame.

Journaled in the frame is a transverse shaft 22, which shaft is in two parts, each part entering the brake valve casing from opposite sides of the latter. One part of this shaft carries the brake valve 29, to be hereinafter more fully described.

On the shaft 22 is a beveled pinion 23, which meshes with a larger pinion or gear 24, carried by a vertical shaft 25, provided on its upper end with a suitable operating handle 26. The shaft 25 and handle 26 constitute the actuating and controlling lever of the machine. On one end of the shaft 22 is secured a crank arm or rheostat lever 27 contacting with the points of a rheostat 28. It is to be understood of course that suitable electrical connections exist between the rheostat and the motor.

The brake valve 29 shown in detail in Figs. 3, 4 and 5, is provided with a passage or port 30, extending entirely therethrough, and adapted to be brought into registry, and moved out of registry with ports 31, 32, to which latter ports pipes 18 and 20 respectively are connected, pipe 20 connecting with port 31, and pipe 18 connecting with port 32. The brake valve is provided on its one end or face with a lug 34, through which the port 30 extends, and the brake valve casing is provided with an exhaust port 33 which may be located at any desired point, and which allows the air to escape from the brake cylinder except at the time when the passage 30 is registering with ports 31, 32, and conducting air to cylinder 12, and applying the brakes.

The construction will be fully understood by the foregoing description taken in connection with the accompanying drawings, and in describing the operation, reference will be had to diagrammatical view Fig. 6 of the drawing.

The actuating and controlling lever 25, controlling the motive power of the vehicle and also actuating the brake valve, is so arranged that it may be manipulated to control the motive power without bringing the valve into position so as to apply the brakes. If the handle 26 of said actuating and controlling lever 25, be moved to point A, which for illustrative purposes we will assume is the point at which the power is cut off from the motor, such movement, has not been sufficient to move the brake valve into position to admit air to cylinder 12. When handle 26 is moved however in the reverse direction to point B, the brake valve 29, has been moved so as to bring port 30 into registry with ports 31, 32, thus allowing air to pass from reservoir 21, through pipe 20, and pipe 18, to cylinder 12, and through the medium of the piston in said cylinder, actuating rods 13, 14, and intermediate connections with the brake bands to actuate the latter and apply the brakes. At all other positions of the handle 26 however, namely in its forward movement to point C, or in its reverse movement to point D, air is shut off from the brake cylinder 12, and the latter is opened to the atmosphere through port 33. At all points of the travel of the handle 26, the rheostat lever 27 is influenced to change the speed either forward or reverse of the motor. It will be observed therefore, that when the handle 26 is at point A, the power is shut off and no brakes are applied; whereas at point B, the power is shut off, but port 30 has been brought into registry with ports 31, 32, so as to make a full application of the brakes. As soon as lever 26 is moved from point B, the brakes are released, and the brake cylinder is opened to the atmosphere at all other points throughout the range of movement of the lever 26 between its points C and D.

Having fully described my invention, what I claim as new, and desire to secure by Letters Patent is:

1. In combination with a motor-driven vehicle, and brakes for said vehicle, a brake-cylinder having a piston, connections between the rod of said piston and the said brakes, an air-reservoir, a brake-valve casing, and a brake-valve in said casing, connections between said air-reservoir and the brake-valve casing, and between said brake-valve casing and the brake-cylinder, and a single actuating-element for controlling the motive-power of said vehicle and said air-brake valve.

2. A brake-valve having a lug on one face, and provided with a port extending diagonally through the valve and said lug.

3. In air-brakes, a brake-valve comprising a casing closed at one end and having an exhaust port in its other end, inlet and outlet ports in said casing, and a brake-valve rotatably-mounted in the casing and having a lug on one face, and a port extending through the valve and said lug.

4. An air-brake valve having a lug on one face with a port extending through the valve and said lug.

In testimony whereof I affix my signature in presence of two witnesses.

JAMES T. JOHNSON.

Witnesses:
J. T. SETTLE,
T. W. BRADFORD.